United States Patent [19]

Sawhill

[11] 3,919,217

[45] Nov. 11, 1975

[54] CHLOROCYANURIC ACID MANUFACTURE

[75] Inventor: Duane L. Sawhill, Orange, Conn.

[73] Assignee: Olin Corporation, New Haven, Conn.

[22] Filed: July 20, 1972

[21] Appl. No.: 273,655

[52] U.S. Cl. ............................................ 260/248 C
[51] Int. Cl.$^2$ ................................. C07D 251/28
[58] Field of Search ................................. 260/248 C

[56] References Cited
UNITED STATES PATENTS 3,073,823    1/1963    Merkel et al. .................... 260/248

Primary Examiner—John M. Ford
Attorney, Agent, or Firm—James B. Haglind; Donald F. Clements; Thomas P. O'Day

[57] ABSTRACT

Chlorocyanuric acids are produced by chlorinating an aqueous suspension of alkali metal bicarbonate and cyanuric acid to a pH below 5 and separating the chlorocyanuric acid from the resulting suspension.

8 Claims, No Drawings

CHLOROCYANURIC ACID MANUFACTURE

Dichlorocyanuric acid and its salts, as well as trichlorocyanuric acid are well known products of commerce finding wide use in washing, bleaching, cleansing and sanitizing applications. The common commercial batch manufacturing process for the trichlorocyanuric acid is introducing gaseous chlorine into a solution of trisodium cyanurate with good mechanical agitation to a pH of 4.5 or below. In a continuous process, gaseous chlorine and a solution of trisodium cyanurate are fed simultaneously into a reaction zone maintained at 4.5 pH or below. In either case the reaction temperature is not particularly critical but is usually maintained at $25° \pm 15°C$. Dichlorocyanuric acid is made similarly, batchwise or continuously, except that the cyanuric acid is fed to the reaction as its dibasic salt of sodium, potassium, calcium or other alkali or alkaline earth metal rather than as its tribasic salt.

U.S. Pat. No. 2,975,178 discloses preparing trichlorocyanuric acid by chlorinating an aqueous slurry of sodium bicarbonate at 0°C. to saturation or a pH of about 3.3, then adding aqueous sodium cyanurate.

U.S. Pat. No. 2,938,032 discloses preparing trichlorocyanuric acid by chlorinating a suspension of alkali metal bicarbonate and cyanuric acid in anhydrous acetone at temperatures below room temperatures.

In the method of the present invention, a first aqueous suspension of alkali metal bicarbonate and cyanuric acid is chlorinated to form a second aqueous suspension of the chlorocyanuric acid product in a solution of sodium chloride and carbon dioxide having a pH below 5 and separating said chlorocyanuric acid product from said solution.

The advantages of this procedure are that it requires little pH monitoring, starting materials are cheap, the reaction products except the chlorocyanuric acid products are soluble in water, yield and purity are high and the process can be operated batchwise or continuously. Further, the method of this invention avoids the hazards of $NCl_3$ formation, the hazards of recovering a chlorocyanuric acid from acetone by distillation and it completely avoids the use of caustic alkalies.

In the method of this invention, the amount of alkali metal bicarbonate is sufficient, when reacted with chlorine, to provide a molar ratio of hypochlorous acid to cyanuric acid of about 2:1 when dichlorocyanuric acid is the desired product and about 3:1 when trichlorocyanuric acid is the desired product. Suitable molar proportions are, for example, 1.8:1 to 2.2:1 of chlorine and bicarbonate to cyanuric acid when dichlorocyanuric acid is the desired product and from 2.8:1 to 3.2:1 when trichlorocyanuric acid is the desired product.

Equations representing the course of the reactions in this process are:

$$NaHCO_3 + Cl_2 \rightarrow NaCl + HOCl + CO_2 \quad (1)$$

$$2HOCl + C_3N_3O_3H_3 \rightarrow C_3N_3O_3Cl_2H + 2H_2O \quad (2)$$

$$3HOCl + C_3N_3O_3H_3 \rightarrow C_3N_3O_3Cl_3 + 3H_2O \quad (3)$$

Nearly stoichiometric proportions are suitably used, but an excess of up to 10 percent is preferred. The formation of HOCl solutions by chlorination of bicarbonates is known to the art. A slight excess of chlorine, up to about 10 percent, at about 0°C. renders a pH of 5 or less in the solution containing dissolved alkali metal chloride and HOCl. The $CO_2$ is evolved. At pH below 5, the HOCl formed in the presence of the cyanuric acid reacts to form the desired dichlorocyanuric acid or trichlorocyanuric acid, and alkali metal chloride remains in solution. A final pH of about 2 to 5 is satisfactory. Recovery of the product is a simple separation, suitably by centrifuging or filtering of the undissolved chlorocyanuric acid product from the solution, washing and drying suitably by air, inert gas or reduced pressure.

Any of the alkali metal bicarbonates are suitable, for example, potassium bicarbonate, although sodium bicarbonate is cheaper and satisfactory.

Temperatures below 40°C. are suitable although temperatures of about $25° \pm 15°C$. are preferred. Temperatures of 0° or slightly lower are suitable.

The amount of water is advantageously limited to provide a slurry containing undissolved as well as dissolved sodium bicarbonate initially in a batch operation. Continuously, at least two stages are preferable. In the first stage solid sodium bicarbonate is maintained and in the second stage chlorination without further introduction of sodium bicarbonate completes dissolution and reaction of the sodium bicarbonate.

Example I

A slurry of 38.7 g. (0.3 mol) of cyanuric acid in 300 g. of water in a one liter beaker was agitated at high speed with a Teflon coated stirrer. A single probe, combination pH electrode was immersed in the slurry along with a fritted glass gas diffuser tube. A slurry of 79.6 g. (5 percent excess) of sodium bicarbonate in another 300 g. of water, well agitated to maintain the bicarbonate in suspension, was slowly transferred to the bottom of the cyanuric acid slurry by a peristaltic pump. Chlorine was simultaneously passed into the cyanuric acid slurry via the gas diffuser tube at the bottom of the beaker. A pH below 3.0 was maintained by adjusting the bicarbonate flow and the chlorine flow during a period of 2 hours. Evolved $CO_2$ cooled the reaction mixture and maintained it at 23°C. NO additional cooling was required.

The trichlorocyanuric acid product was vacuum filtered, vacuum dried for 1½ hours at 105°C. and analyzed.

Yield (based on cyanuric acid), percent 80.6
Available chlorine, percent 89.1

What is claimed is:

1. The method of preparing chlorocyanuric acid which comprises reacting chlorine with a first aqueous suspension of alkali metal bicarbonate and cyanuric acid to form a second aqueous suspension of solid chlorocyanuric acid in a solution of an alkali metal chloride having a pH below 5 and separating said solid chlorocyanuric acid from said solution.

2. The method of claim 1 in which the temperature of said first aqueous suspension and said second aqueous suspension is between 0° and 40°C.

3. The method of claim 1 in which the molar ratio of chlorine to cyanuric acid in said first aqueous suspension is from 1.8:1 to 2.2:1 and said chlorocyanuric acid is dichlorocyanuric acid.

4. The method of claim 1 in which the molar ratio of chlorine to cyanuric acid in said first aqueous suspension is from 2.8:1 to 3.2:1 and said chlorocyanuric acid is trichlorocyanuric acid.

5. The method of claim 3 in which the molar ratio of said alkali metal bicarbonate to said cyanuric acid is from 1.8:1 to 2.2:1 in said first aqueous suspension.

6. The method of claim 4 in which the molar ratio of said alkali metal bicarbonate to said cyanuric acid is from 2.8:1 to 3.2:1 in said first aqueous suspension.

7. The method of claim 1 in which said pH is from 2 to 5.

8. The method of claim 1 in which said alkali metal bicarbonate is sodium bicarbonate.

* * * * *